United States Patent
Xu et al.

(10) Patent No.: US 11,144,113 B2
(45) Date of Patent: Oct. 12, 2021

(54) SYSTEM AND METHOD FOR HUMAN INTERACTION WITH VIRTUAL OBJECTS USING REFERENCE DEVICE WITH FIDUCIAL PATTERN

(71) Applicant: Firefly Dimension, Inc., San Jose, CA (US)

(72) Inventors: Ke Xu, Santa Clara, CA (US); Peng Shao, San Jose, CA (US)

(73) Assignee: Firefly Dimension, Inc., San Jose, CA (US)

( * ) Notice: Subject to any disclaimer, the term of this patent is extended or adjusted under 35 U.S.C. 154(b) by 0 days.

(21) Appl. No.: 16/530,823

(22) Filed: Aug. 2, 2019

(65) Prior Publication Data

US 2020/0042078 A1    Feb. 6, 2020

Related U.S. Application Data

(60) Provisional application No. 62/713,887, filed on Aug. 2, 2018.

(51) Int. Cl.
*G06F 3/042* (2006.01)
*G06F 3/01* (2006.01)
(Continued)

(52) U.S. Cl.
CPC .............. *G06F 3/011* (2013.01); *G01S 5/22* (2013.01); *G06F 3/041* (2013.01);
(Continued)

(58) Field of Classification Search
CPC .............. G06F 3/011–015; G06F 3/042–044
See application file for complete search history.

(56) References Cited

U.S. PATENT DOCUMENTS

2010/0295754 A1   11/2010   Cernasov et al.
2011/0205151 A1    8/2011   Newton et al.
(Continued)

FOREIGN PATENT DOCUMENTS

| CN | 112805660 A | 5/2021 |
| WO | 2018094513 A1 | 5/2018 |
| WO | 2020028826 A1 | 2/2020 |

OTHER PUBLICATIONS

International Search Report and Written Opinion for International PCT Application No. PCT/US2019/044939, dated Dec. 11, 2019.

(Continued)

*Primary Examiner* — Sanghyuk Park
(74) *Attorney, Agent, or Firm* — K&L Gates LLP

(57) ABSTRACT

A system for human interaction with virtual objects comprises: a touch sensitive surface, configured to detect a position of a contact made on the touch sensitive surface; a reference layer rigidly attached to the touch sensitive surface and comprising one or more patterns; a display device, configured to display a virtual object that is registered in a reference coordinate fixed with respect to the touch sensitive surface; one or more image sensors rigidly attached to the display device, configured to capture an image of at least a portion of the one or more patterns; and at least one processor, configured to determine a position and an orientation of the display device with respect to the touch sensitive surface based on the captured image, and identify an interaction with the virtual object based on the detected position of the contact made on the touch sensitive surface.

22 Claims, 8 Drawing Sheets

(51) Int. Cl.
 *G06T 7/73* (2017.01)
 *G06F 3/041* (2006.01)
 *G01S 5/22* (2006.01)
 *G06F 3/0481* (2013.01)
 *G06F 3/0482* (2013.01)

(52) U.S. Cl.
 CPC .......... *G06F 3/04815* (2013.01); *G06T 7/73* (2017.01); *G06F 3/0482* (2013.01); *G06T 2207/30204* (2013.01)

(56) References Cited

U.S. PATENT DOCUMENTS

| | | |
|---|---|---|
| 2013/0093661 A1* | 4/2013 | Ali .......................... G06F 3/011 345/156 |
| 2015/0153951 A1 | 6/2015 | Kim et al. |
| 2016/0334938 A1 | 11/2016 | Kang et al. |
| 2017/0031503 A1 | 2/2017 | Rosenberg et al. |
| 2018/0116732 A1 | 5/2018 | Lin et al. |
| 2018/0314416 A1* | 11/2018 | Powderly ........... G02B 27/0172 |
| 2018/0321894 A1* | 11/2018 | Paulovich ........... G03H 1/2249 |

OTHER PUBLICATIONS

International Preliminary Report on Patentability for International PCT Application No. PCT/US2019/044939, dated Feb. 2, 2021.

* cited by examiner

SYSTEM AND METHOD FOR HUMAN INTERACTION WITH VIRTUAL OBJECTS USING REFERENCE DEVICE WITH FIDUCIAL PATTERN

RELATED APPLICATION

This application claims priority to U.S. Provisional Application No. 62/713,887, filed on Aug. 2, 2018, the entirety of which is incorporated by reference herein.

TECHNICAL FIELD

The present disclosure relates generally to the field of augmented reality and virtual reality. In particular, the present disclosure relates to human interaction with virtual objects.

BACKGROUND

User interaction with virtual objects is a widely researched topic in the current field of augmented reality and virtual reality. The common interaction methods may be generally categorized into direct and indirect interaction methods. Direct interaction methods track the user's gestures and postures or spatial positions of hand-held devices such that the hand-held devices can be accurately registered in a virtual space, and the virtual space itself may be accurately overlaid or displayed on top of the real world. As a result, the user can directly interact with virtual objects at their displayed locations. Indirect interaction methods usually comprise an indicator that interacts with virtual elements, and the user controls the indicator's movement and actions via an input device. Furthermore, the movement of the indicator may be scaled or offset with respect to registered input motion, such that with a small interaction area, the user can interact with virtual objects far away or distributed throughout a large space.

Direct interaction methods may employ technologies like hand tracking, body tracking, and 6-degree-of-freedom hand-held controllers. The hand tracking method typically has a gesture capturing and recognition system, wherein gestures can be captured by an image acquisition sensor or a glove equipped with orientation and bending sensors to reconstruct the gestures. The reconstructed gestures or hands and their spatial positions and orientations can then be used to simulate interactions with virtual objects, similar to the case where hands interact with real objects in the physical world. Similarly, a 6-degree-of-freedom hand-held controller has its translation and orientation tracked such that it can be registered in the virtual space and used to create interactions with virtual objects at their displayed locations.

Indirect interaction methods may use variations of traditional input devices like a touchpad, a mouse, or a keyboard. The user may interact with these devices to control the movement of an indicator in a virtual space and interact with virtual elements. For example, an interaction system using a mouse or a touchpad can register the user's hand movement or finger movement on a desk or touchpad surface so that a virtual pointer is moved according to the registered movement and is used to apply actions to the virtual elements. The movement of the virtual pointer may be scaled and its position may be offset with respect to that of the hands or fingers, so that the user can navigate the pointer across the entire virtual space without running out of space in the interaction area of the input device. In addition, sometimes only the relative movement is registered by the input device so that the movement range of the virtual pointer is further extended by the user performing multiple relative movements on the input device.

While direct interaction using, e.g., hand tracking or hand-held controllers provides an authentic experience and a high degree of freedom in controlling the virtual objects, the necessity of constantly keeping hands in the mid-air and moving hands around in the physical world can quickly introduce fatigue and prevent long-time usage. In addition, achieving reliable and high-fidelity spatial tracking of hand or body with relatively low-cost sensors and streamlined user setup experience is challenging. Indirect interaction using, e.g., keyboard, mouse, or touchpad systems, offers familiar experience from the personal computer/smartphone era and allows the user to interact with virtual contents with ease, but it reduces the immersion created by the augmented reality or virtual reality systems.

SUMMARY

Methods and systems are disclosed that allow a user to view and interact directly with both three-dimensional (3D) and two-dimensional (2D) virtual contents accurately overlaid on top of an interaction area of a touch input device. Such a system retains the immersion of an augmented reality or virtual reality system, by allowing the users to interact directly with virtual objects at their displayed locations and with the exact input motion registered. At the same time, the integration of a touch input system provides a physical surface for the interaction and hand resting. Therefore, precise, responsive and reliable tracking of input motion as well as an effortless interaction experience can be achieved.

In one aspect of the present disclosure, a system for human interaction with virtual objects comprises: a touch sensitive surface, configured to detect a position of a contact made on the touch sensitive surface; a reference layer rigidly attached to the touch sensitive surface and comprising one or more patterns; a display device, configured to display a virtual object that is registered in a reference coordinate fixed with respect to the touch sensitive surface; one or more image sensors rigidly attached to the display device, configured to capture an image of at least a portion of the one or more patterns; and at least one processor, configured to determine a position and an orientation of the display device with respect to the touch sensitive surface based on the captured image, and identify an interaction with the virtual object based on the detected position of the contact made on the touch sensitive surface.

In one aspect of the present disclosure, the virtual object may be a three-dimensional virtual object. In another aspect of the present disclosure, the virtual object may be a two-dimensional virtual element. In one aspect of the present disclosure, the display device is a see-through display device.

In one aspect of the present disclosure, the one or more patterns comprise one or a plurality of fiducial markers. In one aspect of the present disclosure, wherein the one or a plurality of fiducial markers are configured to absorb infrared light, and the one or more image sensors are configured to sense infrared light. In one aspect of the present disclosure, each of the one or plurality of fiducial markers comprises a rectangle containing an internal grid representation of binary codes. In one aspect of the present disclosure, each of the one or plurality of fiducial markers comprises a plurality of image features with known positions, wherein each of the image features corresponds to a unique feature descriptor.

In one aspect of the present disclosure, the one or more patterns comprise a plurality of light sources with known positions. In one aspect of the present disclosure, the plurality of light sources are infrared light sources, and the one or more image sensors are configured to sense infrared light. In one aspect of the present disclosure, the plurality of light sources are configured to be turned on in a predetermined order.

In one aspect of the present disclosure, the one or more patterns comprises a mask and one or more light sources, wherein at least a portion of light emitted from the one or more light sources and passing through the mask is captured by the one or more image sensors. In one aspect of the present disclosure, the one or more patterns further comprises a diffuser configured to diffuse light emitted from the one or more light sources. In one aspect of the present disclosure, the one or more patterns further comprises a light guide plate configured to receive light emitted by the one or more light sources from at least one side of the light guide plate and direct at least a portion of the light to the mask above the light guide plate.

In one aspect of the present disclosure, the touch sensitive surface is at least partially transparent, and the reference layer is arranged underneath the touch sensitive surface. In one aspect of the present disclosure, the reference layer is arranged adjacent to at least one side of the touch sensitive surface. In one aspect of the present disclosure, the reference layer is arranged above the touch sensitive surface.

In one aspect of the present disclosure, the at least one processor is configured to identify an interaction with the virtual object when the detected position of the contact matches a position of the virtual object. In one aspect of the present disclosure, the virtual object is elevated from the touch sensitive surface, and the at least one processor is configured to identify an interaction with the virtual object when the detected position of the contact matches a position of a virtual footprint projected from the virtual object on the touch sensitive surface. In one aspect of the present disclosure, upon the interaction being identified, the display device displays a virtual two-dimensional menu approximate to the virtual footprint.

In one aspect of the present disclosure, a system for human interaction with virtual objects comprises: a touch sensitive surface, configured to detect a position of a contact made on the touch sensitive surface; a display device, configured to display a virtual object; one or more ultrasonic transmitters rigidly attached to one of the touch sensitive surface and the display device, configured to emit ultrasonic signals; one or more ultrasonic receivers rigidly attached to the other one of the touch sensitive surface and the display device, configured to receive the ultrasonic signals emitted by the ultrasonic transmitters; and at least one processor, configured to determine a position and an orientation of the display device with respect to the touch sensitive surface based at least on time-of-flight of the received ultrasonic signals, and identify an interaction with the virtual object based on the detected position of the contact.

In one aspect of the present disclosure, the system further comprising an inertial measurement unit rigidly attached to the touch sensitive surface and/or an inertial measurement unit rigidly attached to the display device.

In one aspect of the present disclosure, a method for human interaction with virtual objects comprises: detecting a position of a contact made on a touch sensitive surface; displaying, with a display device, a virtual object that is registered in a reference coordinate fixed with respect to the touch sensitive surface; capturing, with one or more image sensors rigidly attached to the display device, an image of at least a portion of one or more patterns on a reference layer rigidly attached to the touch sensitive surface; determining a position and an orientation of the display device with respect to the touch sensitive surface based on the captured image; and identifying an interaction with the virtual object based on the detected position of the contact.

In one aspect of the present disclosure, the one or more patterns comprise one or a plurality of fiducial markers. In one aspect of the present disclosure, the one or more patterns comprise a plurality of light sources with known positions. In one aspect of the present disclosure, the one or more patterns comprises a mask and one or more light sources, wherein at least a portion of light emitted from the one or more light sources and passing through the mask is captured by the one or more image sensors.

DETAILED DESCRIPTION

Figure 1:
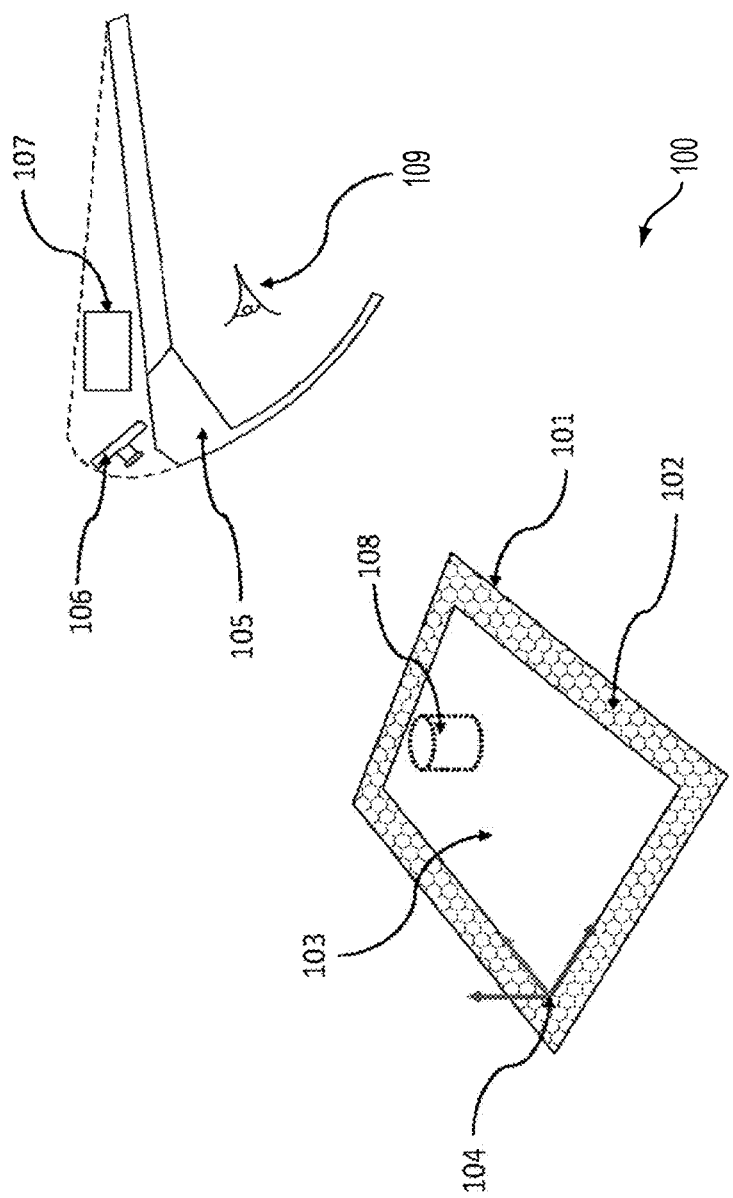
FIG. 1 shows a structural diagram of an exemplary user interaction system according to one aspect of the present disclosure.

FIG. 1 shows a structural diagram of an exemplary system 100 allowing a user to interact with virtual objects according to one aspect of the present disclosure. The system 100 may include a touch input device 101 comprising a reference layer 102 and an interaction surface 103, a displaying device 105, a pose tracking device 106, and a computing unit 107 operatively connected, wirelessly or via one or more cable(s), with the touch input device 101, the displaying device 105 and the pose tracking device 106. In some embodiments, the touch input device 101 may comprise a touchpad including a tactile sensor, wherein the interaction surface 103 may be the active surface of the tactile sensor that detects a finger or object (e.g., a stylus) contact with the surface. In some embodiments, the reference layer 102 may comprise a predetermined set of fiducial patterns. In some embodiments, the reference layer 102 may include a plurality of light sources such as light-emitting diodes (LEDs) arranged into a predetermined pattern. In some embodiments, an exemplary virtual object 108 is registered in a reference coordinate 104 fixed with respect to the touch input device 101, and the relative position and orientation between the reference coordinate 104 and the interaction surface 103 is known, such that locations and motions of detected touch input can be directly mapped to a virtual space. In some embodiments, the pose tracking device 106 may comprise a single or plurality of image sensors rigidly attached to the displaying device 105. A plurality of image sensors may be advantageous in situations where a broader field of view is needed or where objects like the user's hand(s) block a portion of the field of view. In some embodiments, each image sensor may further include a filter that allows light with a predetermined range of wavelength to pass through while attenuate the intensity of light with other wavelength.

In some embodiments, the displaying device 105 may be a see-through displaying device through which the viewer can perceive computer generated virtual contents as well as the real world. As a result, the system 100 can be used in an augmented reality application. In some embodiments, the displaying device 105 may be opaque such that it may block the light from the real world and display only the computer-generated virtual contents. As a result, the system 100 can be used in a virtual reality application. In some embodiments, the displaying device 105 may be a head-worn device which is placed in front of the viewer's eye(s) 109 when in use.

In some embodiments, the interaction surface 103 is able to detect and report precise locations of touch events on the surface, wherein the touch events may be generated by contacts made between an object and the surface, wherein the object may be a finger or a hand of the user, or a stylus, etc. In some embodiments, the touch input device 101 may further detect and report a shape of a contact area of the touch event. In some embodiment, the touch input device 101 may further detect and report a force distribution over the contact area of the touch event.

In some embodiments, the reference layer 102 is perceivable by the pose tracking device 106 to determine a position and orientation of the touch input device 101 with respect to the pose tracking device 106. In some embodiments, the reference layer 102 may be a layer of fiducial patterns which may contain a predetermined set of points, lines, or shapes. In some embodiments, the reference layer 102 may comprise a layer of light emitting diodes arranged in a predetermined pattern.

In some embodiments, the interaction surface 103 may comprise a tactile sensor that precisely measures a position of a contact between the sensor and a finger or an object. In some embodiments, the interaction surface 103 may be fully or semi-transparent. As a result, the reference layer 102 may be disposed below the interaction surface 103 while still being perceivable by the pose tracking device 106. In some embodiments, the interaction surface 103 may be opaque. As a result, the reference layer 102 may be disposed on top of the interaction surface 103 or attached to one or more side(s) of the interaction surface 103. In some embodiments, the tactile sensor may further measure an area and/or a force distribution of a contact. In some embodiments, the tactile sensor described above may be resistive sensing or capacitive sensing. The tactile sensor may be any type that one skilled in the art recognizes as suitable for performing the functionalities described herein.

As described above, the touch input device 101 may comprise a reference layer 102. In some embodiments, the reference layer 102 may comprise a predetermined set of fiducial patterns, wherein the fiducial patterns comprises a predetermined combination of features including shapes, lines, and points, wherein the sizes, positions, or orientations of such features are known. As a result, when a portion or the entirety of the fiducial pattern is captured by one or more imaging sensor(s), the position and orientation of the pattern can be determined. In some embodiments, the fiducial patterns may be printed or etched, e.g., with material that absorbs visible light and/or infrared light, on a layer of supporting substrate. In some embodiments, the fiducial patterns may be created by applying an opaque mask, with portions of it cut out, over a diffused illumination source. The fiducial patterns can be fabricated in many forms that one skilled in the art recognizes as suitable for performing the functionalities described herein.

Figure 5A:
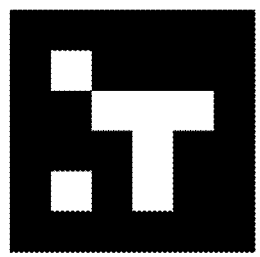
FIG. 5A shows a first exemplary fiducial marker according to one aspect of the present disclosure.
Figure 5B:
FIG. 5B shows a second exemplary fiducial marker according to one aspect of the present disclosure.
Figure 5C:
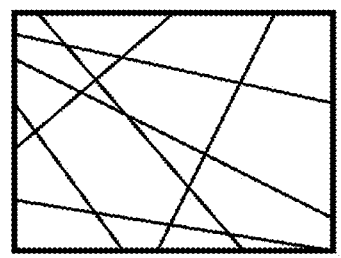
FIG. 5C shows a third exemplary fiducial marker according to one aspect of the present disclosure.

FIGS. 5A, 5B and 5C show non-limiting examples of fiducial markers that can be used with embodiments of the present disclosure.

In some embodiments, the reference layer may comprise a plurality of light sources like light emitting diodes (LEDs) arranged in a predetermined pattern, wherein the positions of each LED is known. As a result, when a portion or all of the LEDs are captured by one or more imaging sensor(s), the position and orientation of the patterns can be determined. In some embodiments, the LEDs are lit up sequentially such that in each frame only one or a few LED(s) is captured by the imaging sensor(s). Because multiple LEDs may share the similar characteristics in a captured image frame if all LEDs are lit at the same time, and it may cause ambiguity issues when the correspondence between each of the observed LEDs and each of the known positions needs to be established. Therefore, the ambiguity issues may be solved by turning on the LEDs in a predetermined sequence. At the same time, because not all LEDs are required to be on all at all times for the pose tracking device to determine the position and orientation, sequentially lighting up the LEDs may save valuable battery power.

In some embodiments, the pose tracking device 106 may comprise a single or a plurality of image sensors. In some embodiments, each image sensor may further contain a filter that allows only light with a predetermined range of wavelength (e.g., infrared light), to pass through while attenuating the intensity of light with other wavelengths (e.g., visible light), wherein the predetermined range may be dependent on the wavelength of the light reflected or emitted by the patterns described above. As a result, the patterns may be clearly captured by the image sensor(s) while other features in the field of view of the sensors(s) may be partially or completely invisible to the sensor(s). In some embodiments, the pose tracking device 106 may further include an illumination device, wherein the illumination device may comprise single or a plurality of light emitting diodes.

The computing unit 107 may comprise one or more processor(s). Although in the example shown in FIG. 1 the computing unit 107 is incorporated into a head-worn device which comprises the pose tracking device 106 and the displaying device 105, the computing unit 107 may be instead arranged in a separate computer or incorporated into the touch input device 101. The computing unit 107 may generate a virtual space which includes virtual contents, wherein the virtual contents may include three-dimensional virtual objects and/or two-dimensional virtual elements. The computing unit 107 may further generate information regarding the virtual contents, wherein the information may include the spatial location, orientation, shape, kinematics, dynamics, and graphics rendering characteristics, etc. When a touch event is detected, the touch position, which is reported by the touch input device 101, and the locations of the virtual objects overlaid on top of the interaction surface 103 will allow the computing unit 107 to determine which virtual object is being interacted with. Furthermore, the type of touch event and characteristics of the virtual object may define different interactions and responses. Meanwhile, the pose tracking device 106 provides necessary measurement data to the computing unit 107 so that a relative spatial relation between the displaying device 105 and the touch input device 101 can be determined. The relative spatial relation generally refers to relative translation and rotation between two entities. As a result, the virtual objects and the responses triggered by user interactions can be properly rendered and displayed from the viewer's perspective.

For example, a virtual object may be enlarged upon being interacted with, and textual information associated with the particular object may be optionally shown. As another example, a virtual object may be dragged from a first location to a second location by a touch interaction.

In one embodiment, the fiducial patterns may comprise a plurality of square-based fiducial markers, each of which containing an external boarder and an internal grid representation of binary codes. An example of such a fiducial maker is shown in FIG. 5A. When captured by the image sensor(s), the fiducial markers in the captured frame are extracted by discarding any shapes that are not 4-vertex polygons, do not have valid binary codes, or do not meet a size threshold. The corners of each valid fiducial marker are detected by a corner detection algorithm. With the known positions of the corners of the fiducial marker, the relative position and orientation of the marker with respect to the image sensor(s) can be estimated, for example by solving the Perspective-n-Point problem. Therefore, pose estimation based on the fiducial patterns is achieved.

In another embodiment, the fiducial patterns may comprise a predetermined image target containing a plurality of features with known positions in the image target and known descriptors. Features in computer vision or image processing are distinct local structures found in an image, such as a "edge" (a set of points in the image which have strong gradient magnitudes), a "corner/interest point" (a set of points where the direction of the gradient change rapidly within the local region), or local image patch. A descriptor encodes the characteristics of a feature, such as the magnitude and orientation of the local gradient of pixel intensities, a vector of intensity comparisons between a set of pixel pairs around the feature. The descriptor can be in many forms, including a numerical value, a vector of numerical values, or a vector of Boolean variables. Descriptors can be used to uniquely identify the corresponding features in an image. For example, in the case of BRIEF (Binary Robust Independent Elementary Features) descriptors, the Hamming Distance between the known descriptor and the descriptor of a candidate feature is calculated and a match is confirmed if the distance is less than a threshold.

When the image target is captured by the image sensor, a feature detection algorithm is used to extract all candidate feature points inside the captured frame, and corresponding descriptors are calculated for the candidate feature points. By comparing the descriptors, some of the candidate feature points are matched with the known feature points in the image target. The matched pairs are used to estimate the relative position and orientation of the image target with respect to the image sensor(s), for example by solving the Perspective-n-Point problem. Therefore, pose estimation based on the fiducial patterns is achieved.

Figure 2:
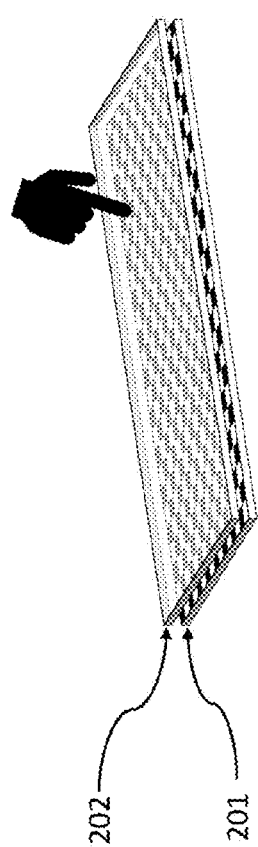
FIG. 2 shows a structural diagram of a first exemplary touch input device according to one aspect of the present disclosure.

FIG. 2 is a structural diagram of a first exemplary touch input device. In the illustrated embodiment of FIG. 2, an interaction layer 202 is disposed on top of a reference layer 201, wherein the interaction layer 202 is fully or partially transparent. The interaction layer 202 may include a tactile sensor as described above. The reference layer 201 may comprise a predetermined set of fiducial patterns described above. Alternatively, the reference layer 201 may comprise a plurality of light emitting diodes (LED) arranged in a predetermined pattern as described above.

Figure 3:
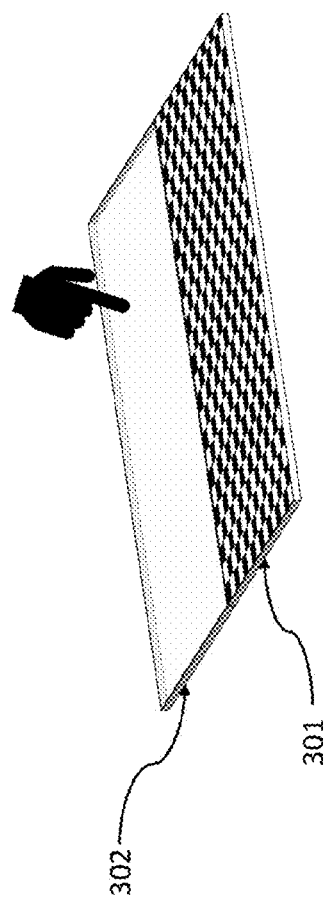
FIG. 3 shows a structural diagram of a second exemplary touch input device according to one aspect of the present disclosure.

FIG. 3 is a structural diagram of a second exemplary touch input device. In the illustrated embodiment of FIG. 3, a reference layer 301 is rigidly attached to one side of an interaction layer 302, wherein the interaction layer 302 may be opaque. The interaction layer 302 may comprise a tactile sensor as described above. The reference layer 301 may comprise a predetermined set of fiducial patterns described above. Alternatively, the reference layer may comprise a plurality of light emitting diodes (LED) arranged in a predetermined pattern as described above.

As an alternative example, as shown in FIG. 1, a reference layer 102 may be arranged around four sides of a rectangular interaction surface 103.

In some embodiments, the touch input device may comprise a plurality of ultrasonic transmitters placed in a predetermined pattern, and the pose tracking device may comprises a plurality of ultrasonic receivers. In some embodiments, the pose tracking device may comprise a plurality of ultrasonic transmitters placed in a predetermined pattern, and the touch input device may comprises a plurality of ultrasonic receivers. As a result, distances between the transmitters and the receivers can be determined by measuring the time-of-flight for ultrasonic signals. Therefore, the position and the orientation of the touch input device can be determined.

Figure 4:
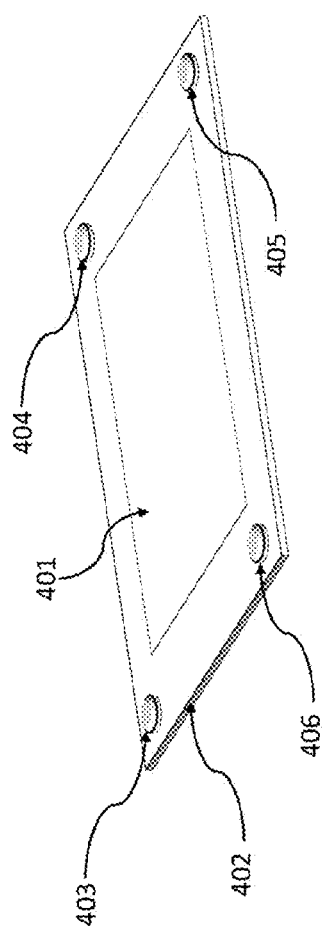
FIG. 4 shows a structural diagram of a third exemplary touch input device according to one aspect of the present disclosure.

FIG. 4 is a structural diagram of a third exemplary touch input device employing ultrasonic transmitters or receivers. In the illustrated embodiment of FIG. 4, a supporting frame 402 is attached to four sides of an interaction layer 401, and four ultrasonic transmitters 403, 404, 405, 406 are disposed on top of the supporting frame 402 and distributed at the four corners. The interaction layer 402 may comprise a tactile sensor as described above. Alternatively, four ultrasonic receivers 403, 404, 405, 406 may be disposed on top of the supporting frame 402.

A variety of methods can be used to to track the position and orientation of a virtual object using ultrasonic receivers and transmitters. For example, in one implementation, three ultrasonic receivers are rigidly attached to one of the displaying device and the touch input device in a non-collinear arrangement, three transmitters are rigidly attached to the other one of the displaying device and the touch input device, and the computing unit is coupled to the transmitters and the receivers. The three transmitters generate ultrasonic pulses at three different frequencies respectively. Each of the three receivers separates the received ultrasonic waves with three different frequencies into three signals, resulting in a total of nine signals. Based on the time-of-flight principle, the nine signals are processed into nine distances between each of the three transmitters and each of the three receivers. As a result, the relative orientation and position between the transmitter assembly and receiver assembly can be estimated.

In another implementation, one ultrasonic transmitter and a 9-axis inertial measurement unit (IMU) are rigidly attached to one of the displaying device and the touch input device, three ultrasonic receivers and a 9-axis IMU are rigidly attached to the other one of the displaying device and the touch input device, wherein the receivers are arranged in a non-collinear arrangement, and the computing unit is coupled to the transmitter, the receivers, and the IMUs. Alternatively, three transmitters and one receiver may be used. The transmitter generates ultrasonic acoustic pulses at a known frequency and the receivers convert the received ultrasonic pulses into three signals. Based on the time-of-flight principle, the signals result in three distances between the transmitter and the three receivers, respectively. As a result, the relative position between the transmitter and the receiver assembly can be calculated. The IMUs measure the absolute orientations of the displaying device and the touch input device, such that the relative orientation between them can be determined.

In some embodiments, a footprint may be displayed for an elevated virtual object. Because user interaction is sensed by a touch input device, the interaction is limited to the proximity of a 2D plane. However, the virtual contents may be displayed above the touch input device with a non-negligible vertical distance. To overcome such a limitation, in one implementation, a virtual footprint, projected from the elevated virtual object onto the interaction layer, is displayed through the displaying device. As a result, the user can interact with the elevated virtual object via its virtual footprint using various touch gestures. For example, the user can perform a pinch gesture on the touch input device over the area of the virtual footprint to scale the corresponding virtual object, or the user can perform a press-and-drag gesture on the virtual footprint to move the corresponding virtual object. Furthermore, when the user touches the area of the virtual footprint, a virtual two dimensional menu element can be displayed on the interaction layer near the virtual footprint to provide additional operations on the corresponding virtual object. The user can tap on different areas of the interaction layer where menu items are displayed to activate related functions. For example, additional operations may include but are not limit to starting an animation associated with the corresponding virtual object, deleting the corresponding virtual object, or change an attribute of the corresponding virtual object.

Figure 6:
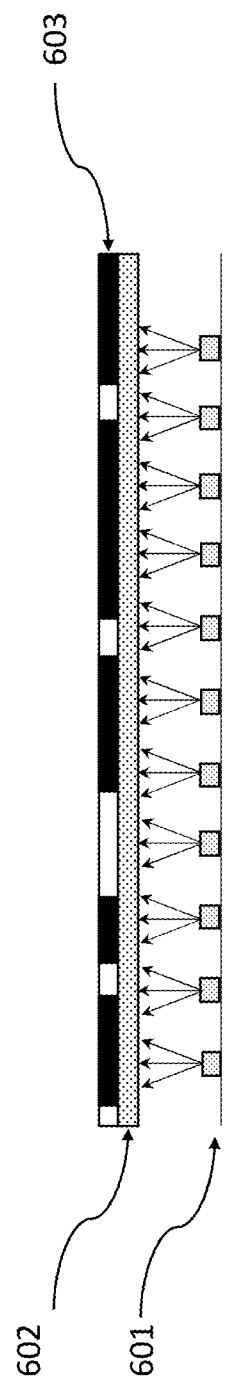
FIG. 6 shows a cross-sectional view of an exemplary reference layer.

FIG. 6 is a cross-sectional view of an exemplary reference layer. In the illustrated embodiment of FIG. 6, a mask layer 603 is arranged above a light source layer 601, and an optional light diffusor 602 may be positioned in between the light source layer 601 and the mask layer 603. The mask layer 603 comprises light transmissive portions, illustrated as bright-colored blocks, and light blocking portions, illustrated as dark-colored blocks. Light emitted by the light sources in the light source layer 601 may be diffused by the light diffusor 602 and passes through the light transmissive portions of the mask layer 603 to form one or a plurality of patterns described above when captured by the image sensor. In some embodiments, the light from the light sources may be infrared, and the light transmissive portions and the light blocking portions are responsive to an infrared wavelength.

In some embodiments, the light blocking portions may comprise a polymer with a light blocking additive. In some embodiments, the light blocking portions may comprise light blocking paint deposited over a substrate. In some embodiments, the light transmissive portion is simply formed by voids, or the lack of any material. The materials of the mask layer 603 may be any type that one skilled in the art recognizes as suitable for performing the functionalities described herein.

In some embodiments, the interaction surface is positioned above the mask layer 603. In some embodiments, the interaction surface is positioned below the mask layer 603. In some embodiments, light blocking material is directly deposited over the interaction surface to form the mask layer 603.

Figure 7:
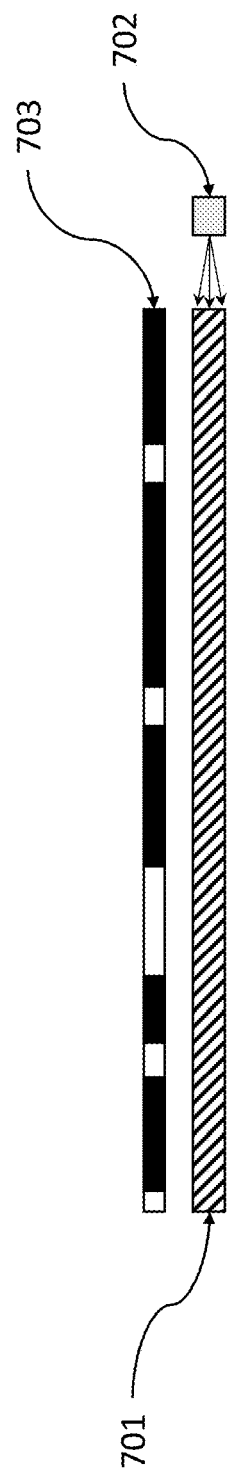
FIG. 7 shows a cross-sectional view of another exemplary reference layer.

FIG. 7 is a cross-sectional view of another exemplary reference layer. In the illustrated embodiment of FIG. 7, a mask layer 703 is arranged above a light guide plate 701 and may have the same configurations as the mask layer 603 as described above. A light source 702 is arranged to emit light laterally into the light guide plate 701 from at least one side of the light guide plate. Light emitted from the light source 702 is redirected by the light guide plate 701 towards the mask layer 703, and passes through the mask layer 703 to form one or a plurality of patterns described above when captured by the image sensor. In some embodiments, the light guide plate 701 may comprise micro-lens arrays on the bottom surface, and the light from the light source 702 is internally reflected down the length of the light guide plate 701 (for example from the right to the left in FIG. 7) and redirected by the micro-lens arrays to pass through the top surface of the plate. The light guide plate 701 may be any type that one skilled in the art recognizes as suitable for performing the functionalities described herein. In some embodiments, the light from the light source may be infrared, and the light transmissive and the light blocking portions of the mask layer 703 are responsive to the infrared wavelength.

In some embodiments, the interaction surface is positioned above the mask layer 703. In some embodiments, the interaction surface is positioned below the mask layer 703. In some embodiments, light blocking material is directly deposited over the touch sensitive surface to form the mask layer 703.

Figure 8:
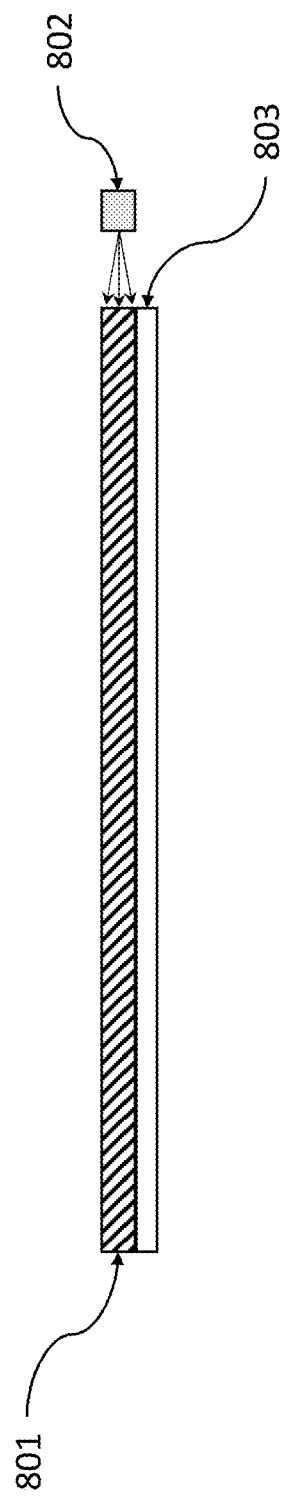
FIG. 8 shows a cross-sectional view of a third exemplary reference layer.

FIG. 8 is a cross-sectional view of a third exemplary reference layer. In the illustrated embodiment of FIG. 8, a light guide plate 801 is positioned above a fiducial layer 803 comprising one or more fiducial pattern(s). A light source 802 is arranged to emit light laterally into the light guide plate 801 from at least one side of the light guide plate 801. Light emitted by the light source is redirected by the front light guide plate to illuminate fiducial layer 803 and form one or a plurality of fiducial pattern(s) described above in an image frame when captured by the image sensor. In some embodiments, the light guide plate 801 may comprise micro-lens arrays on the top surface, and the light from the light source is internally reflected down the length of the light guide plate 801 (for example from the right to the left in FIG. 8) and redirected by the micro-lens arrays to pass through the bottom surface of the plate. The light guide plate 801 may be any type that one skilled in the art recognizes as suitable for performing the functionalities described herein. In some embodiments, the light from the light source may be infrared, and the fiducial pattern(s) is responsive to the infrared wavelength.

In some embodiments, the interaction surface is positioned above the light guide plate 801. In some embodiments, the interaction surface is positioned below the fiducial layer 803. In some embodiments, the interaction surface is positioned between the light guide plate 801 and the fiducial layer 803.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system for human interaction with virtual objects, comprising:
   a touch sensitive surface, configured to detect a position of a contact made on the touch sensitive surface;
   a reference layer rigidly attached underneath the touch sensitive surface and comprising:
      a fiducial layer providing one or more patterns comprised of light transmissive portions and light blocking portions; and
      a planar light source layer, spanning across the entirety of the light transmissive portions and the light blocking portions of the fiducial layer, and configured to cause the one or more patterns of the fiducial layer to be illuminated and at least semi-transparently displayed in the touch sensitive surface; and
   a wearable display device, configured to display a virtual object that is registered in a reference coordinate fixed with respect to the touch sensitive surface;
   one or more image sensors rigidly attached to the display device, configured to capture an image of at least a portion of the one or more patterns in the reference layer; and
   at least one processor, configured to:
      determine a position and an orientation of the display device with respect to the touch sensitive surface by analyzing image data about the one or more patterns found in the captured image;
      access touch data from the touch sensitive surface, the touch data comprising a detected position of contact made on the touch sensitive surface;
      cause the virtual object to be displayed by the wearable display device;
      generate a manipulation with the virtual object based on the detected position of the contact made on the touch sensitive surface; and
      cause the manipulation with the virtual object to be displayed by the wearable display device.

2. The system of claim 1, wherein the virtual object is a three-dimensional virtual object.

3. The system of claim 1, wherein the virtual object is a two-dimensional virtual object.

4. The system of claim 1, wherein the display device is a see-through display device.

5. The system of claim 1, wherein the one or more patterns comprise one or a plurality of fiducial markers.

6. The system of claim 5, wherein the one or plurality of fiducial markers are configured to absorb infrared light, and the one or more image sensors are configured to sense infrared light.

7. The system of claim 5, where each of the one or plurality of fiducial markers comprises a rectangle containing an internal grid representation of binary codes.

8. The system of claim 5, wherein each of the one or plurality of fiducial markers comprises a plurality of image features with known positions, wherein each of the image feature corresponds to a unique feature descriptor.

9. The system of claim 1, wherein the planar light source layer comprises infrared light sources, and the one or more image sensors are configured to sense infrared light.

10. The system of claim 1, wherein the of planar light source layer comprises light sources that are configured to be turned on in a predetermined order.

11. The system of claim 1, wherein the reference layer further comprises a diffuser configured to diffuse light emitted from the planar light source layer.

12. The system of claim 1, wherein the planar light source layer is further configured to receive light emitted by one or more light sources from at least one side of the planar light source layer and direct at least a portion of the light to the fiducial layer above the planar light source layer.

13. The system of claim 1, wherein the touch sensitive surface is at least partially transparent.

14. The system of claim 1, wherein the at least one processor is configured to generate the manipulation with the virtual object when the detected position of the contact matches a position of the virtual object.

15. The system of claim 1, wherein the virtual object is elevated from the touch sensitive surface, and the at least one processor is configured to generate the manipulation with the virtual object when the detected position of the contact matches a position of a virtual footprint projected from the virtual object on the touch sensitive surface.

16. The system of claim 15, wherein the manipulation displayed in the display device comprises a virtual two-dimensional menu approximate to the virtual footprint.

17. The system of claim 1, wherein the planar light source layer is positioned underneath the fiducial layer and wherein light the light transmissive portions and the light blocking portions of the fiducial layer are configured as a mask.

18. The system of claim 1, wherein the planar light source layer is positioned between the touch sensitive surface and the fiducial layer.

19. A method for human interaction with virtual objects, the method comprising:
   detecting a position of a contact made on a touch sensitive surface;
   displaying, with a display device, a virtual object that is registered in a reference coordinate fixed with respect to the touch sensitive surface;
   illuminating onto the touch sensitive surface, one or more patterns of a fiducial layer positioned underneath the touch sensitive surface, the fiducial layer comprising light transmissive portions and light blocking portions, wherein the illuminating is implemented by a planar light source layer of the display device positioned across the entirety of the light transmissive portions and the light blocking portions of the fiducial layer;
   capturing, with one or more image sensors rigidly attached to the display device, an image of at least a portion of the one or more patterns;
   determining a position and an orientation of the display device with respect to the touch sensitive surface based on the captured image;
   accessing touch data from the touch sensitive surface, the touch data comprising a detected position of contact made on the touch sensitive surface;
   causing the virtual object to be displayed by the display device;
   generating a manipulation with the virtual object based on the detected position of the contact; and
   causing the manipulation with the virtual object to be displayed by the display device.

20. The method of claim 19, wherein the one or more patterns comprise one or a plurality of fiducial markers.

21. The method of claim 19, wherein the one or more patterns comprise a plurality of light sources with known positions.

22. The method of claim 19, wherein the one or more patterns comprises a mask and one or more light sources, wherein at least a portion of light emitted from the one or more light sources and passing through the mask is captured by the one or more image sensors.

\* \* \* \* \*